(12) United States Patent
Knibbe et al.

(10) Patent No.: US 8,665,762 B2
(45) Date of Patent: Mar. 4, 2014

(54) APPARATUS AND METHOD OF CONFIGURING A DEVICE IN A NETWORK

(75) Inventors: Engel J. Knibbe, Heeze (NL); Theodoor H. Stommen, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 915 days.

(21) Appl. No.: 11/993,053

(22) PCT Filed: Jun. 15, 2006

(86) PCT No.: PCT/IB2006/051921
§ 371 (c)(1),
(2), (4) Date: Dec. 19, 2007

(87) PCT Pub. No.: WO2006/136985
PCT Pub. Date: Dec. 28, 2006

(65) Prior Publication Data
US 2010/0214948 A1  Aug. 26, 2010

(30) Foreign Application Priority Data

Jun. 23, 2005  (EP) .................................. 05105640

(51) Int. Cl.
*H04B 1/44* (2006.01)
*G05B 11/32* (2006.01)
*G01M 1/38* (2006.01)
*G06F 9/455* (2006.01)

(52) U.S. Cl.
USPC ........... 370/282; 370/255; 370/328; 398/151; 455/420; 700/19; 700/66

(58) Field of Classification Search
USPC .......... 370/254, 255, 282, 313, 328; 375/219; 398/151, 156, 165, 167.5; 455/3.03, 455/3.06, 418, 419, 420, 41.2, 88; 700/12, 700/13, 17–19, 65, 66, 258, 275–278; 709/220–222; 718/1
See application file for complete search history.

(56) References Cited

U.S. PATENT DOCUMENTS

| | | | | |
|---|---|---|---|---|
| 5,905,442 A | * | 5/1999 | Mosebrook et al. | ........... 340/3.7 |
| 6,384,842 B1 | * | 5/2002 | DeKoning et al. | ............ 715/734 |
| 6,748,195 B1 | * | 6/2004 | Phillips | ........................ 455/41.2 |
| 6,782,439 B2 | * | 8/2004 | Kim | ............................... 710/110 |
| 6,944,584 B1 | * | 9/2005 | Tenney et al. | ................... 703/22 |

(Continued)

FOREIGN PATENT DOCUMENTS

| | | |
|---|---|---|
| EP | 1401149 | 3/2004 |
| EP | 1455482 A1 * | 9/2004 |

(Continued)

*Primary Examiner* — Michael Thier
*Assistant Examiner* — Benjamin H Elliott, IV (57) ABSTRACT

The invention provides a method, apparatus and computer program product for ensuring that a device (26) operable in a network (1) is configured to operate according to documented functional requirements for the network. Positional information comprising the coordinates of each device (26, 9, 50) in the network (1) is received via a gateway (9, 50) at a data processing apparatus (10) storing the documented functional requirements. The coordinates of each device (26, 9) in the network (1) are used to deduce the required functionality of the device based on the stored functional requirements, instructions for implementing the functionality are generated and the instructions are sent via the gateway (9, 50) to the network. The invention has particular relevance in the commissioning stage of a lighting control network.

17 Claims, 7 Drawing Sheets

(56) References Cited

U.S. PATENT DOCUMENTS

| | | | |
|---|---|---|---|
| 7,305,244 B2* | 12/2007 | Blomqvist et al. | 455/456.5 |
| 7,323,991 B1* | 1/2008 | Eckert et al. | 340/572.1 |
| 7,324,824 B2* | 1/2008 | Smith et al. | 455/456.1 |
| 7,403,838 B2* | 7/2008 | Deen et al. | 700/276 |
| 7,590,703 B2 | 9/2009 | Cashman et al. | 709/208 |
| 7,630,323 B2* | 12/2009 | Bridgelall | 370/254 |
| 2003/0013462 A1* | 1/2003 | Adachi | 455/456 |
| 2003/0020595 A1 | 1/2003 | Wacyk | |
| 2003/0125014 A1* | 7/2003 | Inukai et al. | 455/410 |
| 2003/0130039 A1* | 7/2003 | Nelson | 463/42 |
| 2003/0185237 A1* | 10/2003 | Baker, Jr. | 370/469 |
| 2003/0191389 A1* | 10/2003 | Sano et al. | 600/437 |
| 2003/0232598 A1* | 12/2003 | Aljadeff et al. | 455/41.2 |
| 2004/0051664 A1* | 3/2004 | Frank | 342/457 |
| 2004/0054820 A1* | 3/2004 | Karaoguz et al. | 710/8 |
| 2004/0198374 A1* | 10/2004 | Bajikar | 455/456.1 |
| 2004/0203870 A1* | 10/2004 | Aljadeff et al. | 455/456.1 |
| 2004/0256474 A1* | 12/2004 | Park et al. | 236/51 |
| 2004/0263388 A1 | 12/2004 | Krumm et al. | |
| 2005/0071498 A1* | 3/2005 | Farchmin | 709/236 |
| 2005/0206555 A1* | 9/2005 | Bridgelall | 342/127 |
| 2006/0193262 A1* | 8/2006 | McSheffrey et al. | 370/241 |
| 2006/0229746 A1* | 10/2006 | Ollis et al. | 700/65 |
| 2007/0109975 A1* | 5/2007 | Reckamp et al. | 370/254 |

FOREIGN PATENT DOCUMENTS

| | | |
|---|---|---|
| WO | WO0182032 | 11/2001 |
| WO | WO 0182032 A2 * | 11/2001 |
| WO | WO0197466 | 12/2001 |
| WO | WO 0197466 A1 * | 12/2001 |
| WO | WO2004027445 | 4/2004 |

* cited by examiner

APPARATUS AND METHOD OF CONFIGURING A DEVICE IN A NETWORK

The invention relates to a device configuration in a network, particularly but not exclusively to a method and apparatus for configuring a device operable in a network according to predetermined functional requirements for the network. In particular, the invention relates to a method of automatically commissioning a network of devices.

Lighting control systems are used both in commercial and domestic establishments in order to generate desired light settings quickly, to capture energy savings and to comply with laws and regulations. However, designing and commissioning a lighting control system may be time consuming and error prone. In high level systems, dedicated software run on a personal computer is often used to specify the functional requirements of the lighting system and to configure the devices. In establishments where flexibility is an advantage, the connections between sensors, luminaires and switches may be implemented using radio frequency signals rather than wires. The software allows a user to define virtual connections between the devices using a personal computer. The code for implementing the connections can subsequently be uploaded from the personal computer to the memory of the devices. Standard software packets, such as LonMaker™, provide the design engineer with tools for designing a complete high-level system, wherein each physical device is represented by a virtual device stored in a database. By using a graphical user interface (GUI), the engineer can easily group the virtual devices that are allowed to talk to each other and specify the information that the virtual devices are allowed to share. The GUI may also allow a user to position the virtual devices with respect to an architectural drawing imported into the program. A print out of the drawing showing where the devices are to be installed facilitates the installation process, which may be performed by a contractor. The software may also allow the user to print out a list of all components required to implement the system. The list can be sent to the contractor and can be used for costing estimates.

However, after the devices have been installed, the devices need to be configured to work according to the functional requirements stored by the software on the personal computer, i.e. the system needs to be commissioned. The commissioning step involves associating each device defined using the software with a physical device in the network. Conventional methods involve reading off the barcodes of each device in the room and pasting the bar codes on printouts of the floor plan. The barcodes of each device can then be inputted as an address of each virtual device in the computer program and instructions in accordance with the functional requirements specified using the software can then be uploaded to the devices. One disadvantage with the conventional method of commissioning the network is that it is time-consuming and error prone. Moreover, the designer has to spend a considerable amount of time on site to match each of the physical devices with a virtual device in memory. Moreover, if the devices are moved, someone has to update the location of the device in memory and change the functional requirements in dependence on the new location in order for the system to continue to work according to the functional requirements specified for the system.

US-2003/0130039 describes a method and apparatus for tracking and determining a location of a gaming machine or other machine within a casino or hotel. The location information of the gaming machine is communicated to a host computer and the operation of the machine can be controlled by the host computer with consideration to the location of the machine. However, the document does not disclose a method of associating the physical gaming machine with a set of instructions for a virtual gaming machine with coordinates corresponding to the coordinates of the physical gaming machine.

The invention aims to address these problems.

According to the invention there is provided a method of configuring a device operable in a network to operate according to pre-determined functional requirements for the network stored in a data processing apparatus, comprising receiving positional information for the device at the data processing apparatus; relating the positional information to the stored functional requirements; and transmitting the functional requirements for the device to the network.

The documented functional requirements may comprise functional requirements for a plurality of virtual devices corresponding to the devices of the network. Moreover, the coupling of the positional information with the stored functional requirements may include matching the coordinates of each physical device with coordinates of a virtual device and deducing the functional requirements for the physical device based on the functional requirements for the virtual device.

Yet further, the method may comprise receiving at the data processing apparatus at least one of a unique ID and a network address for the device and storing the unique ID of the device in memory of the data processing apparatus, such that the functional requirements of the device can be sent to an address based on the at least one of a unique ID and a network address.

Thus, each device in memory is automatically associated with a physical device and the physical device can be easily configured with the functional requirements stored for the virtual device. Thus, the invention provides an easy, quick and accurate way of commissioning a network.

Moreover, according to the invention, there is provided an apparatus for configuring a device operable in a network to operate according to pre-determined functional requirements for the network; comprising a memory for storing the functional requirements; a receiver for receiving positional information of the device; a processor for relating the positional information to the functional requirements; and a transmitter for transmitting the functional requirements of the device to the network.

The apparatus may further comprise means for receiving the functional requirements. The means for receiving the functional requirements may be a graphical user interface for allowing a user to define the functional requirements and/or means for importing architectural drawings including electrical wiring diagrams. The graphical user interface may further be used to view the functional requirements. The electrical diagrams may be used to deduce the functional requirements.

According to the invention there is further provided a device operable in a network comprising means for obtaining positional information with respect to at least three other devices in the network; a transmitter for transmitting the positional information via the network to an apparatus configured to store functional requirements for said network; a receiver for receiving instructions via the network in response to transmitting the positional information to the apparatus.

The transmitter and the receiver may form part of a radio frequency transceiver.

Embodiments of the invention will now be described, by way of example, with reference to the accompanying drawings, in which.

Figure 1:
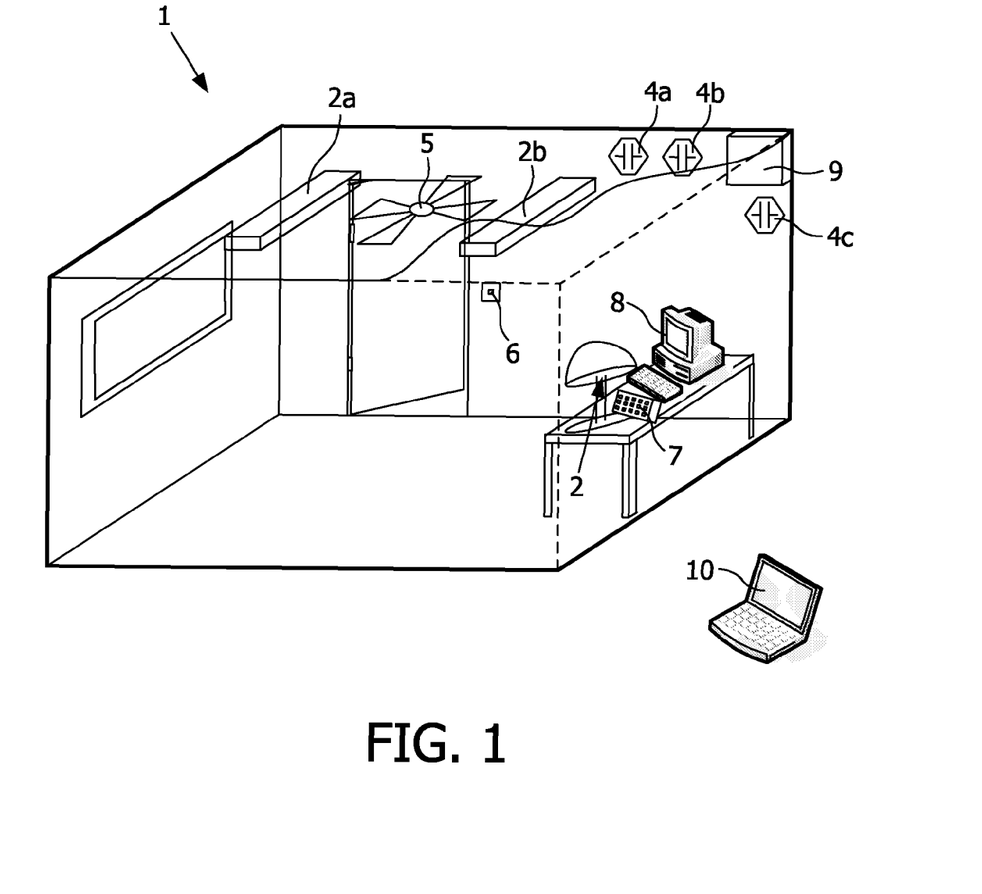
FIG. 1 is a three-dimensional illustration of a room comprising a system to be commissioned according to the invention.

FIG. 1 illustrates a room comprising a network 1 of devices to be commissioned according to the invention. The room of FIG. 1 is an office; however, the invention may also be used in a network in, for example, a home, a hotel, a restaurant, a school or outdoors. The nodes of the network, shown in FIG. 1, include two ceiling lamps 2a, 2b, a table lamp 3, a number of sensors 4a, 4b and 4c, a ceiling fan 5, a switch/dimmer 6, a radio frequency remote control 7 and a personal computer 8. However, it should be appreciated that any type of luminaire, sensor, switch, HVAC (heating, ventilation and air-conditioning) device or window blind may be included in the network. The network also comprises a local control module 9 located in a convenient location of the room. The local control module 9 stores control data and instructions for controlling the nodes of the network. The local control module wirelessly communicates with the luminaires, sensors, switches and the fan using radio frequency signals and each of the nodes of the network comprises a radio frequency transceiver (not shown). Alternatively, one or more of the nodes may be hard wired to the local control module 9. The network of device 1 may form part of a larger network of devices extending outside the room, and the local control module and the luminaires, sensors and switches may be enabled to communicate with the devices outside the room. The instructions and control data stored in the local control module 9 is downloaded from a central controller 10. In the system of FIG. 1, the central controller is implemented in a laptop; however, the central controller may be implemented in any type of data processing apparatus. The central controller 10 and the local control module 9 may be temporarily connected using a cable (not shown) for exchanging data.

Figure 2:
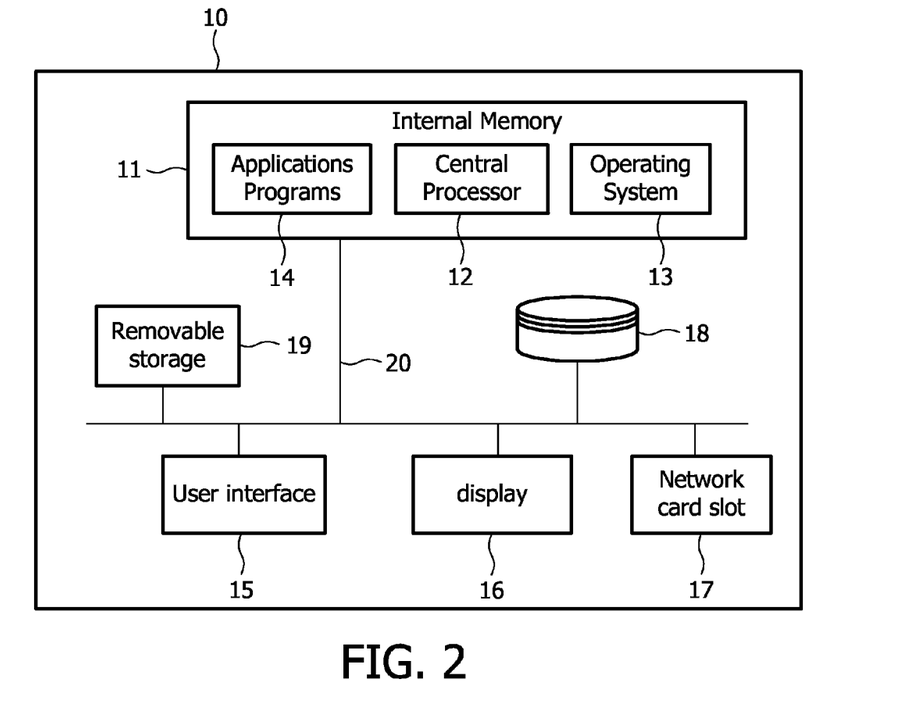
FIG. 2 is a schematic diagram of a central controller.

Referring to FIG. 2, a central controller 10 includes an internal memory 11 including a central processor 12, an operating system 13 and one or more application programs 14. The central controller 10 further comprises a user interface 15 and a display 16 for interacting with the user. Yet further, the central controller 10 comprises a network card 17, which may be fitted in an ISA card slot and connected to a spine bus (not shown) for carrying commands to the local control module 9, a database 18 for storing the functional requirements of each component of the network 1 and means for retrieving digital data from a pre-recorded source, such as a DVD, a CD-rom or a floppy disc, schematically shown as removable storage 19. Communication between the internal components of the central controller is achieved via a bus 20, which provides a common point of electrical connection for all the internal components of the central controller 10. In one embodiment, the database 18 of the central controller is located remotely of the installation site and a laptop on the site may have a connection to a LAN for accessing the information stored in the database.

Figure 3:
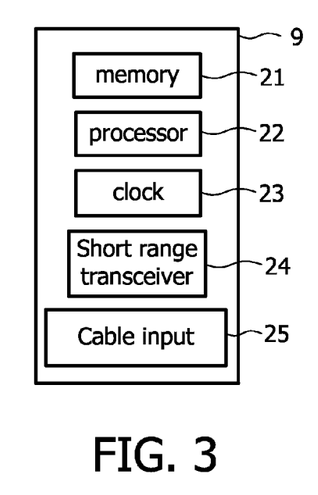
FIG. 3 is schematic diagram of a local control module.

Referring to FIG. 3, the local control modules 9 comprises a memory 21, a processor 22, an internal clock 23 for synchronising with other nodes in the network, a short range transceiver 24 for communicating with the nodes in the network 1 and an input 25 for receiving a spine cable from the central controller. The memory 21 stores instructions for the nodes in the network. For example, it may store instructions for switching on and off a selection of luminaires and HVAC devices in response to signals received from the sensors in the system. It may further store the coordinates of each device in the network as will be described in more detail hereinafter.

Although the communication between the central controller 10 and the local control module 9 has been described with respect to FIG. 2 and FIG. 3 to be performed using a spine cable, it should be understood that the communication between the central controller 10 and the local control module 9 can also be wireless and be performed using radio frequency signals. Thus, in an alternative embodiment, the network card slot of the central controller is replaced by a short-range transceiver and the input 25 for the cable of the local control module is not needed. The short-range transceiver of the central controller may either be an internal component or it may be in the form of an accessory connected to the central controller using known means, such as a USB port.

Figure 4:
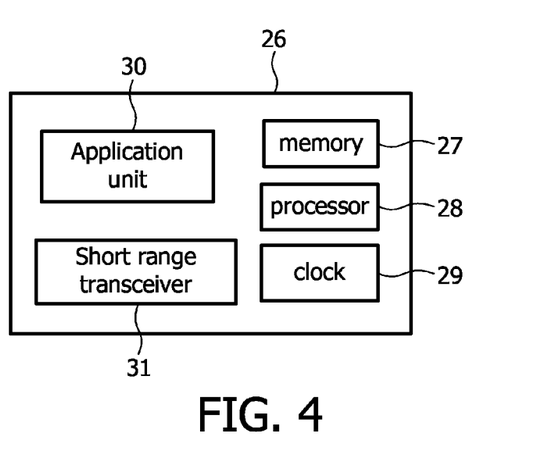
FIG. 4 is a schematic diagram of a node in the system.

Referring to FIG. 4, a schematic diagram of a node 26 in the network is shown. The node may be a luminaire, a sensor, a switch, a dimmer and so on. The node comprises a memory 27, a processor 28 and an internal clock 29 for synchronising with other nodes. It also comprises an application unit 30, which in the case of a simple lamp would be a light bulb, but in the case of a sensor would be the equipment necessary for fulfilling the sensing requirements. The node 26 also comprises a short-range transceiver 31 for receiving instructions from the local control module. The instructions are passed to the processor 28 to be processed and the processor controls the application unit 30. The memory may also store instructions for when and how the application unit should be operated and the unique ID number and address of the node.

Preferably, node 26 and local control module 9 are compliant with ZigBee™ standards. However, the devices may also be compliant with other standards such as HomeRF™, Bluetooth™ and IEEE 802.11x. According to the ZigBee™ standards, tens of thousands of devices can be wirelessly connected to form a network. However, it may be desirable to divide the devices into a number of separate networks for easier operation. A device can operate in 2.4 GHz, 915 MHz and/or 868 MHz radio frequency bands; support raw data transfer rates of 250 kilobits per second (kbps), 40 kbps and 20 kbps respectively and have a transmission range typically between 10 and 75 meters. However, in order to lower the prices of the nodes the transmission range may be between 2 and 5 meters. If the nodes in the network operate according to the ZigBee™ standard, the local control module 9 can take on the role of the network controller and the routing protocol allows ad-hoc routing of messages sent through the system such that instructions from the local control module 9 can reach nodes 26 not within direct transmission range thereof.

The designer of the system 1 defines functional requirements for the system, wherein the functional requirements are suitable for the environment in which the system is installed. The functional requirements for an office may include, for example, that the light in the office should be turned on every morning, Monday to Friday, at 7.30 and be switched off at night. The functional requirements may also include that the lights should only be turned on when a person is present in the office. The intensity of the light and the temperature in the room may also be controlled to depend on the weather and the season. For example, in order to save on energy the lights may be configured to be dimmed on a sunny day. Moreover, a number of settings of the system can be pre-programmed for selection by a user of the office. For example, the user of the office may prefer the lights to have a lower intensity when he/she is working on the pc than when he/she is reading a printed document. Furthermore, the user may prefer the room to be fairly dark when showing a presentation on the pc to his colleagues/clients. Consequently, a number of settings for the luminaires may be defined and the settings may be selected by the user by operating the remote control 7 or the personal computer 8.

A system design engineer may use a software suite to design the network according to the functional requirements. After the system has been designed, installed, configured and commissioned the instructions for implementing the functional requirements of the system are downloaded into the local control module 9 and into the memory of the relevant nodes 26. For example, instructions for the sunlight detection sensor 4c to continuously report on the level of brightness in the room to the local control module may be downloaded into the memory of the sunlight detection sensor 4c. The local control module may be configured to instruct the lamps to decrease their intensity when the brightness in the room reaches a predetermined value stored in memory 21 of the local control module. Alternatively, the predetermined value may be stored in the memory 27 of the sensor 4c and the sensor may only send a message to the local control module when the detected value exceeds the predetermined value. Similarly, the temperature sensor 4a and the presence detection sensor 4b may store instructions for reporting to the local control module 9 and the local control module may store instructions for responding to the information received from the sensors. Furthermore, the code controlling the settings defined by the design engineer may be downloaded to the personal computer, the remote control and the local control module. Thus, when the user presses a key on the remote control, a signal may be sent to the local control module, prompting the local control module to look up the relevant setting in memory and to send instructions for applying the setting to the lamps 2a, 2b and 3.

Figure 5:
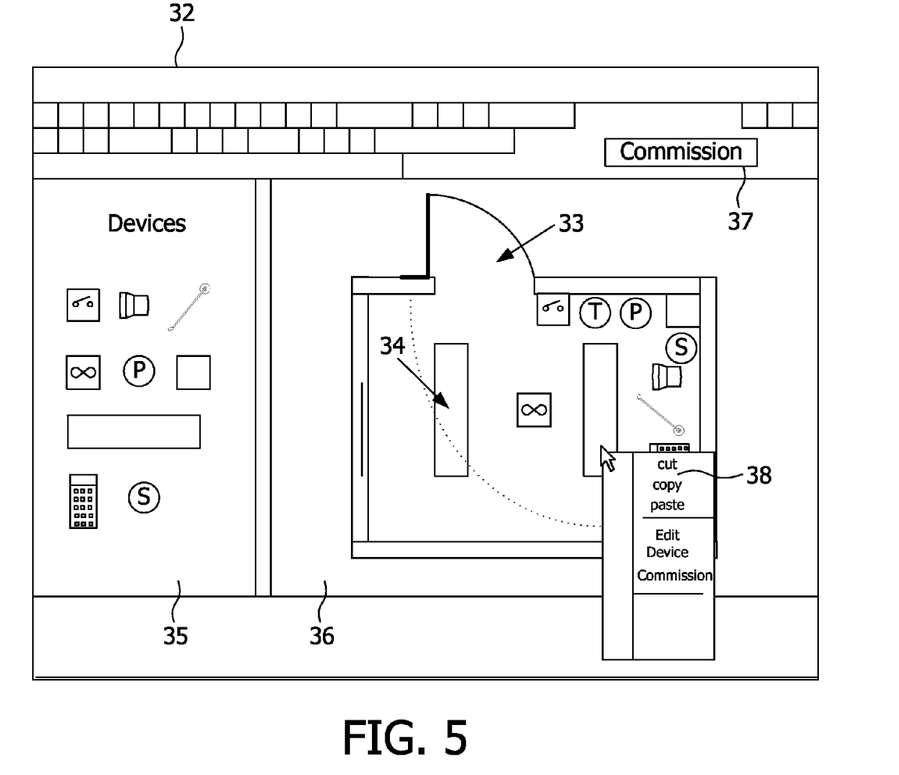
FIG. 5 illustrates a graphical user interface provided by software for implementing the invention.

Referring to FIG. 5, the software for designing the system may comprise a GUI 32. The software may be based on conventional software such as AutoCAD™ or LonMaker™. The design engineer may import an architectural drawing 33 of the building into the GUI 32 and use the drawing as a background for creating a graphical representation of the network. The architectural drawing may be imported from AutoCAD™ or Microsoft Office Visio™. The GUI 32 may allow a design engineer to define virtual devices, wherein each virtual device corresponds to a physical device 26 in the network. Each virtual device has a graphical representation 34 in the GUI and the position of the virtual device with respect to the architectural drawing is chosen to correspond to the actual position of the physical device in the network. For example, the GUI of FIG. 5 shows virtual devices representing the ceiling lamps 2a and 2b, the table lamp 3, the ceiling fan 5, the switch/dimmer 6, the personal computer 8, the remote control 7 and the three sensor 4a, 4b and 4c of FIG. 1. The dotted line schematically illustrates the range of the presence detection sensor 4b.

In more detail, the GUI of FIG. 5 comprises two windows 35 and 36. Graphical representations of templates for commercial available lighting devices are shown in window 35 and the architectural drawing with the virtual devices placed in the foreground are shown in window 36. The designer can select a particular template for a device from window 35 and "drag and drop" the graphical representation into the window 36 to create a new virtual device. The device can then be configured to work according to desired functional requirements. The graphical user interface also comprises a number of menus and buttons. For example, at the top right corner is a menu 37 titled "Commission" for starting the commissioning process according to the invention. It is also contemplated that the software may have a tool for defining the nodes that are allowed to talk to each other. The software may either allow the connections to be specified by enabling a user to draw "wires" between the virtual device in the graphical user interface or by providing a dialogue box for the user to enter the list of nodes with which a particular node is allowed to talk.

Additional menus and dialogue boxes will be provided for allowing the designer to define the functionality of each node and for entering the exact coordinates of each device. Alternatively, the exact coordinates may be calculated from the position of the device with respect to the architectural drawings.

In an alternative embodiment, the imported architectural drawings may include the existing electrical wiring or the electrical wiring to be installed. The software may then include an application for reading and deducing the functionality of each device from the wiring diagram. For example, the application may deduce which luminaires are controlled by which switch and which sensor by analysing the wiring diagram. Consequently, the coordinates of each node are obtained automatically from the wiring diagrams together with a list of other nodes with which each node is allowed to communicate. The application program may further create and position the virtual devices in the graphical user interface automatically after having processed the wiring diagrams. The designer may then check the wiring in the graphical user interface and define additional functionality and communication links, that could not be deduced from the wiring diagrams, if required. This alternative method may be used either for re-commissioning an existing network of nodes or for designing and installing a new system.

Even if the system has been designed off site, when the design documents are loaded into the central controller on site, the coordinates and functional requirements of each virtual device is saved in the database 18 of the central controller. After a virtual device has been created and positioned with respect to the architectural drawings, either by the designer using the graphical user interface or automatically by an analysis of the wiring diagrams, a menu 38 for configuring the virtual device may appear in response to the user of the software operating the right hand key of the mouse when the cursor is positioned over the graphical representation of the virtual device. The options of the menu may include, but are not limited to, an option to copy the virtual device, an option to commission only that particular device and an option to edit the functional requirements of the device. By selecting the option Edit Device, a menu for specifying the functional requirements of the device may appear.

Figure 6:
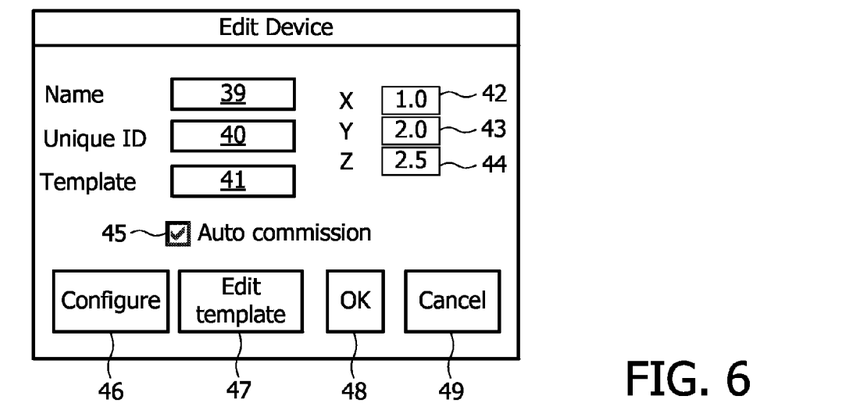
FIG. 6 shows a dialogue box, which forms a part of the graphical user interface of FIG. 5.

An example of a dialogue box is shown in FIG. 6. The dialogue box of FIG. 6 allows a user to define the functionality of the virtual device corresponding to the ceiling lamp 2b of FIG. 1. The dialogue box comprises six text fields 39-44, for entering the name, the unique ID, the type and the x-, y- and z-coordinates of the device respectively. The dialogue box further comprises a check box 45 for indicating whether the device should be commissioned according to the invention. If the checkbox 45 is checked, the ceiling lamp 2b is commissioned when the menu "Commission" 37 of FIG. 5 is used to start the commissioning of the system 1. The dialogue box further comprises four buttons, labelled Configure 46, Edit Template 47, OK 48 and Cancel 49 respectively. It is contemplated that the user may define or change the type of the device by entering a code for the template in the template text field 41. Alternatively, the user can press the Edit Template button and choose from a number of different templates or define a new one. Moreover, by clicking the Configure button, a new dialogue box for specifying the functional requirements of the device is opened. Clicking OK will save any changes made in the dialogue box to the database 18 and close the box and clicking Cancel will close the box without saving any changes.

The x-, y- and z-coordinates may either be entered manually by the design engineer or the software may calculate the coordinates from the wiring diagrams in the imported architectural drawings or from the position of the virtual device in window 36. The unique ID of the device will be entered according to the invention, described in more detail hereinafter. In an alternative embodiment, the unique ID is replaced by the network address of the node. The user may also give the virtual device a name, which may be easier to remember than the Unique ID.

After the functional requirements of the network have been defined, the required devices for the network are ordered and installed according to the printed drawings produced using the graphical user interface. The last step includes associating each virtual device with a physical device and ensuring that the functionality specified for the each virtual device is loaded into the memory of the corresponding physical device. This step is referred to as the commissioning step.

It is contemplated that for the network shown in FIG. 1, the commissioning is performed on site. Accordingly, the commissioning engineer brings a laptop with the design documents in memory to the site. The commissioning is performed by receiving positional information at the central controller 10 from each node in the network. The positional information may either be the coordinates of each node in the network or, alternatively, the distance between a first node, whose position is unknown, and at least three other nodes in the system with known positions. If the first node and the three other nodes are located at the same height, for example ceiling height, distance measurements to the three other nodes will allow the central controller to calculate the position of the first node by using triangulation. Moreover, if details of a grid are stored in the central controller, coordinates of the exact position in the grid may be calculated. However, if the first node and the three other nodes are located at different heights, distance measurements between the first node and four other nodes with known positions are needed for the coordinates of the first node to be obtained. In a network operating according to the ZigBee™ standard, time-of-flight signals can be used to determine the distance to other devices. It is contemplated that initially, the local control modules provide the nodes with known positions. However, after the coordinates of the first node have been calculated, the position of that node may be used to calculate the coordinates of a second node with unknown position.

The calculations to obtain the coordinates from the distance measurements do not necessarily need to be performed at the central controller. They may also be performed in the local control module 9 or by the processor 28 of the nodes 26 themselves. The calculated coordinates can then be sent to the central controller. In the descriptions hereinafter, it will be assumed that the coordinates for all nodes are calculated in the local control module 9 and sent to the central controller 10.

After receiving the coordinates of a node in the system, the central controller compares the coordinates of the physical device with the coordinates of each of the virtual devices until a match is found. The process is repeated for all the physical devices in the nodes. According to the invention, the message to the central controller comprising the coordinates also includes the unique ID of the device. The message may further include the type of device. Consequently, if there is a local control module installed very close to a sensor, the software will be able to match the physical sensor to the virtual sensor and not to the virtual local control module. The unique ID of the physical device, communicated to the central controller 10, is then saved for the corresponding virtual device. The instructions relevant to each device can then be downloaded into the appropriate physical device or in a local control module controlling the physical device. It is contemplated that if the installer has installed the devices exactly according to the architectural drawings, the coordinates of each device saved in the database of the central controller may be used to correct the coordinates of each physical devices stored by the local control module. The method for matching the virtual devices with the physical devices is described in more detail with respect to FIG. 8. If the system at a later date needs to be upgraded the engineer can change the functional requirements of the virtual devices and return to the site where the new instructions are downloaded into the memory of the nodes of the network.

The process of designing, installing and commissioning the system according to the invention will now be described in more detail with reference to FIG. 7. At step S7.1, architectural drawings of the building in which the system is to be installed are imported into the software suite in accordance with the invention. If the software further defines the origin of a grid, coordinates in the grid can be defined with respect to the architectural drawing. It is contemplated that the graphical user interface allows the building to be visualised in 2D or 3D.

At step S7.2, the virtual devices are created and positioned with respect to the architectural drawings. The user may position the virtual devices by manually entering the coordinates for each device. Alternatively, the coordinates are automatically calculated for each device when the graphical representation of the virtual device is dragged and dropped onto the architectural drawing. Yet another alternative involves the software analysing wiring diagrams that may form part of the architectural drawings and automatically creating virtual devices in accordance with the wiring diagrams.

At S7.3, the functional requirements of the virtual devices are defined. The steps S7.1 to S7.3 can be performed off site. At step S7.4, the devices are installed at the site. By using a print out of the architectural drawings with the virtual devices positioned in the foreground, the installation is facilitated. Subsequently, the installed physical devices need to be associated with the virtual devices.

At step S7.5 the design documents are loaded into memory at a computer on site using the removable storage 19 or by accessing a database over a network. Alternatively, the design documents may already be stored in the memory of the laptop when the laptop is brought to the site. By operating the graphical user interface, the commissioning can then be started in accordance with the invention. The commissioning process is started using the menu option 37 of the GUI 32. The first stage of the commissioning process involves the nodes of the network performing time-of-flight measurements to measure the distances between each node and at least three nodes with known positions. The time-of-flight measurements may be initiated in response to the central controller transmitting a signal to the local control module comprising instructions for initiating the time-of-flight measurements. The coordinates of each node are then calculated from the distance measurements. At step S7.6 the coordinates of each device together with data indicating the type and unique ID of the device are sent from the local control module 9 to the central controller 10. The coordinates of each device are then matched at step S7.7 to the coordinates of a virtual device in memory and the unique ID of the physical device is stored with the functional requirements of the virtual device in memory. This process is described in more detail with respect to FIG. 8.

At step 7.8, the functional requirements of each device are translated into instructions that can be understood by the local control modules and the nodes in the network. The instructions and data are sent to the local control module through a cable or by radio frequency signals. It is contemplated that the instructions are divided up into messages for each node and that the local control module checks the destination of each message and forwards the messages to the destination. It is also possible that the local control module processes all instructions received from the central controller and creates and transmits messages to each node with instructions that are relevant for that node.

Figure 7:
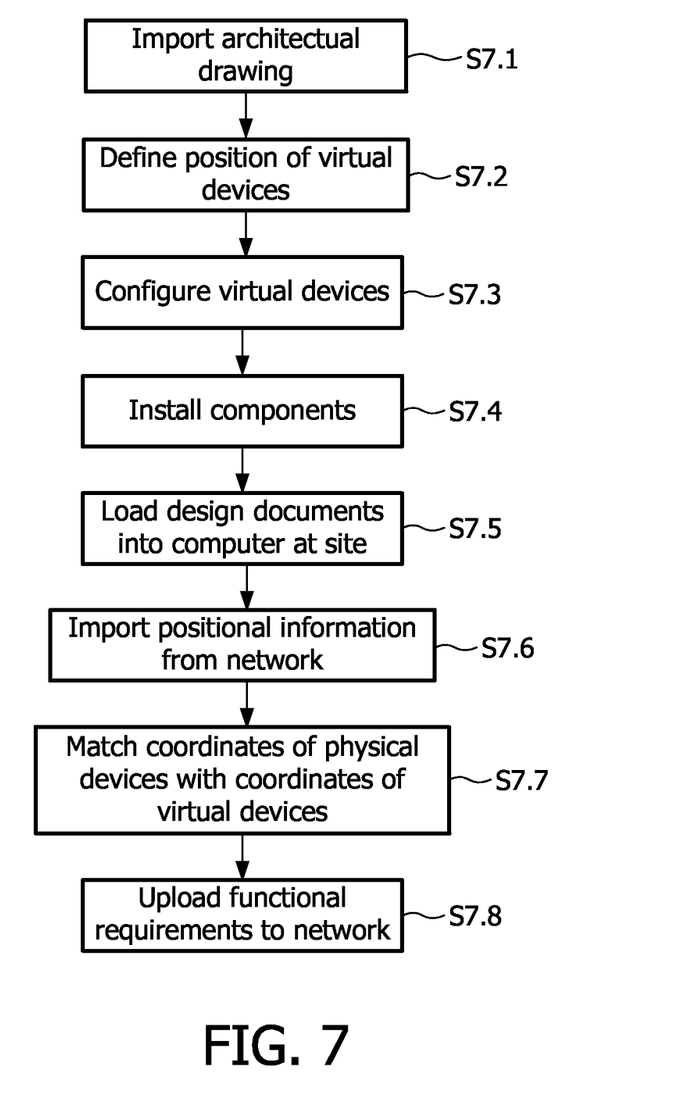
FIG. 7 illustrates the steps of a method for designing, configuring, installing and commissioning a system according to the invention.

It should be understood by the skilled person that the process described with respect to FIG. 7 may be modified such that the components are installed before the system is designed, i.e. step S7.4 is performed before any or all of steps S7.1-S7.3. This would, for example, be the case if the process were used to re-commission an existing system.

Figure 8:
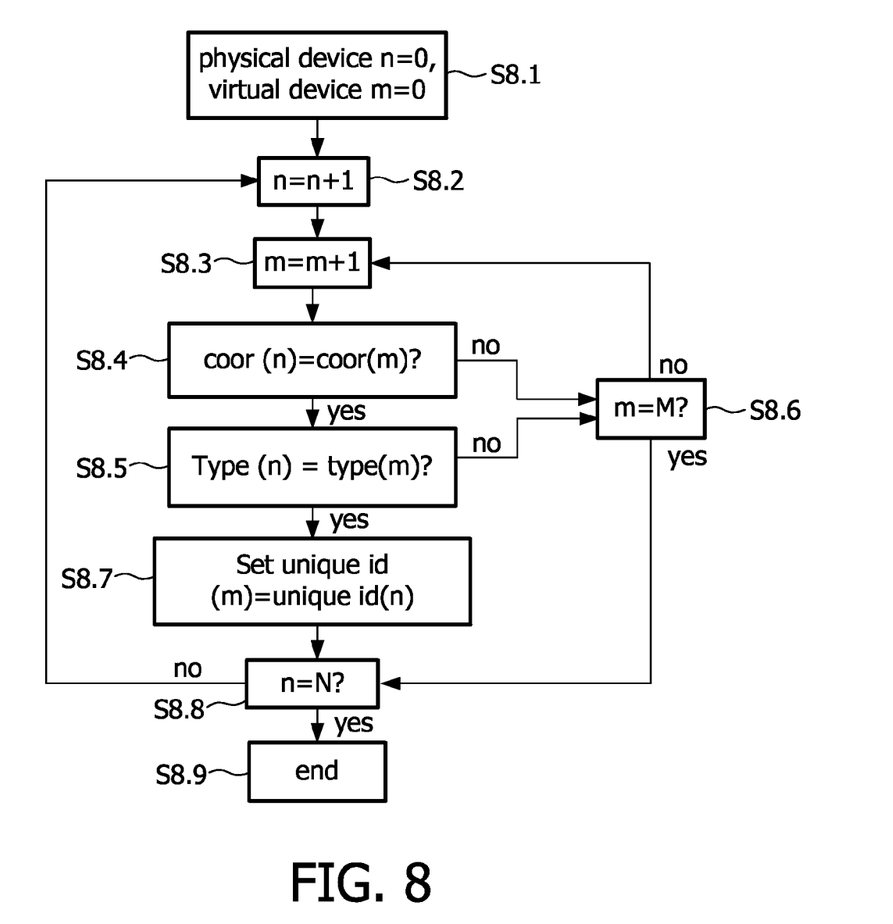
FIG. 8 shows an algorithm for coupling the positional information of the nodes with the documented functional requirements according to the invention.

The process of matching the positional information received from the network with the virtual devices will now be described in more detail with reference to FIG. 8. The process is implemented as an algorithm for a computer program and FIG. 8 outlines the steps in the algorithm. The positional information received from the network lists the coordinates, types and unique ID numbers of N physical devices. Each physical device is given a number n from 1 to N. The software calculates the number M of virtual devices defined for the system. Each virtual device is given a number m from 1 to M. At step S8.1, the system prepares to start the matching process and sets variables m and n to zero. At step S8.2, n is incremented by 1. Similarly, at step S8.3, m is incremented by 1.

At step S8.4, the coordinates of virtual device m are compared to the coordinates of physical device n. At the beginning of the process, both m and n are equal to 1. Consequently, the coordinates of the first virtual device in memory are compared to the coordinates of the first physical device in the received list. The x-coordinates, y-coordinates and z-coordinates of the physical device and the virtual device may be compared separately or together. Taking into account that the installer may not have installed the device at the exact position specified by the architectural drawings and that there may be an error in the time-of-flight measurements, the system may determine that there is a match between a virtual device and a physical device, even though the position of the two devices do not match exactly. If the x-, y- and z-coordinates are compared separately, there may be defined an acceptable error range for each pair of coordinates. If the x-, y- and z-coordinates are considered together, for example by calculating a vector from the position of the virtual device to the position of the physical device, the positions will match if the magnitude of the vector is smaller than a stored threshold value.

If there is a match between the coordinates of the physical device and the coordinates of a virtual device, the algorithm moves on to step S8.5. However, if the physical device is located outside the acceptable range of the coordinates that would indicate a match, the algorithm moves on to S8.6. At step S8.6, m is compared to M, i.e. the total number of virtual devices in memory. If the virtual device is the last device in memory, the next physical device n is considered (S8.8, S8.2). However, if there are additional virtual devices in memory that have not been compared with device n, the algorithm moves on to step S8.3 and m is incremented by 1, i.e. the next virtual device is considered.

On the other hand, if there is a match between the coordinates of physical device n and virtual device m, the computer program proceeds to step S8.5. At step S8.5, the type of physical device n is compared to the type of the virtual device m. If the types do not match, the computer program moves onto step S8.6. However, if the type of device n matches the type of device m, the program proceeds to step S8.7. At step S8.7 the unique ID of the virtual device in memory is set to the unique ID of the physical device. Consequently, next time the dialogue box shown in FIG. 6 is opened by a user, the number shown in text field 41 is the unique ID of the physical device corresponding to the virtual device associated with the dialogue box.

After the physical device n has been matched to a virtual device in memory, the system checks at step S8.8 whether device n is the last device on the list received from the network. If device n is the last device n in the network, all the physical device have been matched to virtual devices and the algorithm ends, S8.9. However, if n is not the last device on the list, i.e. n is smaller than N, then the algorithm proceeds to step S8.2, n is incremented by 1 and the system proceeds to find a match for the coordinates of physical device n+1.

After the algorithm has been repeated for all physical devices, the algorithm ends at step S8.9. The program may then move on to check for errors in the matching process. For example, it is possible that two physical devices have been matched to the same virtual device, or that one of the physical devices did not find a match. The software will be developed to account for all such eventualities.

Figure 9:
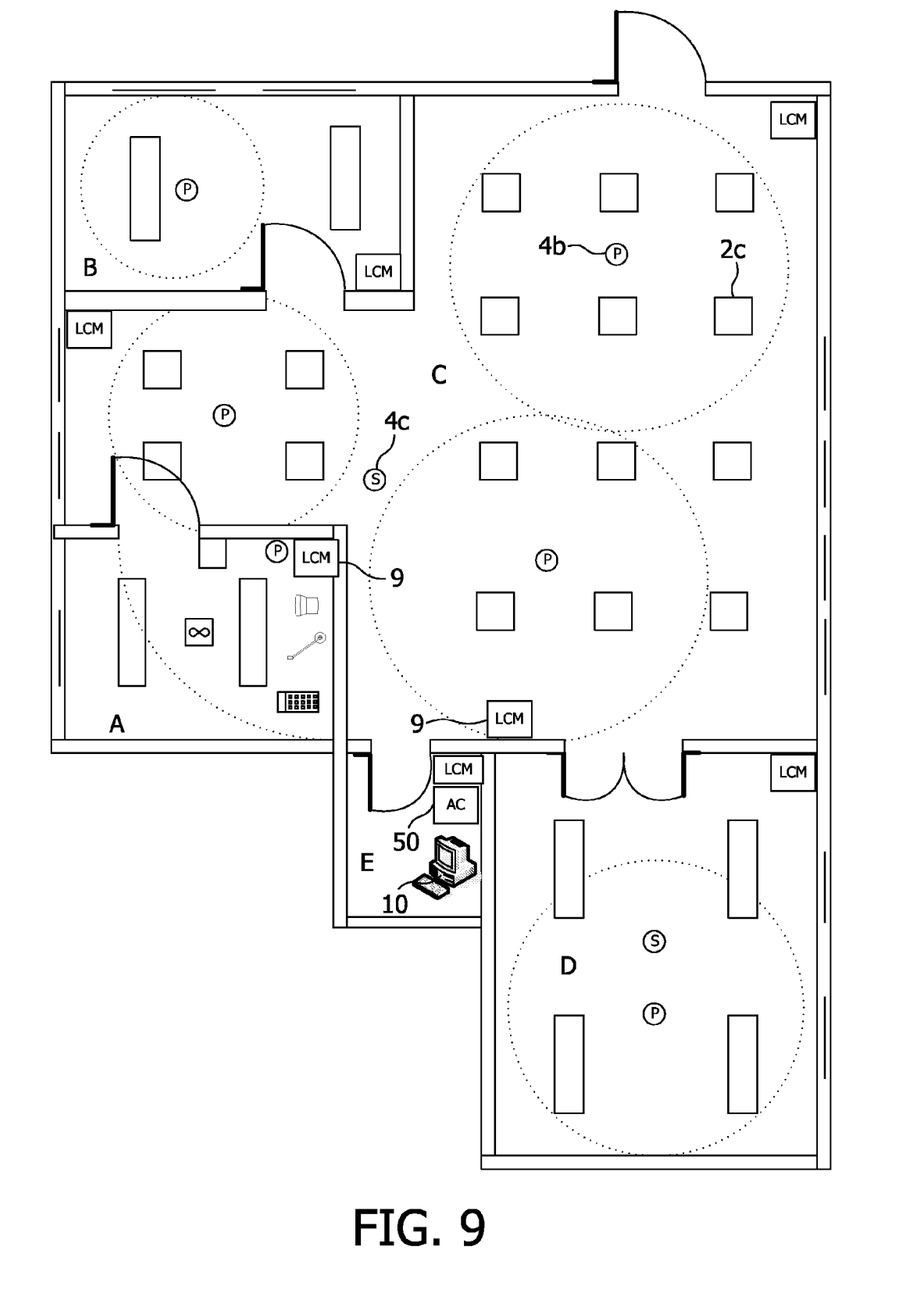
FIG. 9 shows another system to be commissioned according to the invention.

If the layout of the system will be changed often, for example if the lighting devices are often moved from one area to another, it may be worth having a central controller 10 always on site and connected to the system such that the system can easily be updated. FIG. 9 illustrates a further example of the invention. Referring to FIG. 9, a lighting control system is located on a floor comprising a number of offices. The floor is divided into zones A-E. Zone A is an office, comprising the small network described with respect to FIG. 1. However, in this embodiment the network is further connected to luminaires, sensors, switches and local control modules outside the room. Zone B is another office, zone C is an open space seating area, zone D is a kitchen or a conference room and zone E is a room for keeping the central controller 10. In contrast to the central controller implemented in the laptop described with respect to FIG. 1, the central controller in this embodiment of the invention is always on site and controls a much larger system. The central controller 10 is implemented in a dedicated workstation. The central controller is connected to area controller 50, which in turn controls all the local control modules 9 in zones A-E. It is contemplated that there is approximately one local control module per room and each local control module is in charge of a the nodes in that room. If the network stretches over a number of floors, there may be one area controller 50 per each floor. It is contemplated that the system has been designed off site.

However, the design documents have been loaded into the central controller on site either over a network or by using the removable storage 19. The central controller is connected using spine bus cables to one or more area controllers 50. The area controller may either be connected to the local control modules using spine cables or using radio frequency signals. The nodes in the network include a number of presence detection and sunlight detection sensors 4b and 4c. The ranges of the presence detection sensors 4b are illustrated schematically by dotted lines. The nodes also include a large number of ceiling lights 2c.

When the commissioning according to the invention is commenced, for example by a user operating the menu 37 of the graphical user interface, the central controller sends a command to the area controller 50, which in turn sends commands to the local control modules 9. It is contemplated that one floor of the network is commissioned at a time. However, it is also possible that only one room, or a part of the area is commissioned at a time. The command from the central controller 10 will be sent to the appropriate local control modules 9. The local control modules will subsequently send requests to the nodes instructing them to check their positions. After receiving range measurements from each node, the local control modules will calculate the coordinates of each node and forward the list of nodes, their coordinates and the unique ID and the type of each node to the area controller 50, which in turn will forward the information to the central controller 10. The central controller will match all the physical devices to the virtual devices stored in memory and perform an error checking procedure to ensure that all the physical devices have been accounted for. The central controller will subsequently translate the functional requirements for each node into instructions and upload the instructions via the area controller to the appropriate nodes. A testing procedure for checking the commissioned system can thereafter be commenced.

If the positions of the nodes in the system are at a later time altered, the system may automatically reconfigure itself. For example, if one of the components, for example the remote control, is moved from zone A to zone D, the functionality of the remote control may change to correspond to the functionality specified for zone D instead of zone A. In order to implement the invention, the system may be configured to intermittently check the positions of all nodes in the system. Alternatively, the positioning process may be triggered when one of the devices is moved. At the end of the process for checking the positions of the nodes, the coordinates of all devices may be sent to the central controller. Alternatively, only the coordinates of the devices that have been moved are sent to the central controller. The central controller updates the coordinates of the virtual device corresponding to the physical device that has been moved. Subsequently, it will check whether the functional requirements of that device are dependent on the location of the device. For example, the functional requirements may specify that if a device moves outside a specific region controlled by one local control module and into the region controlled by a new local control module, it should start communicating with the new local control module instead of the old local control module. For example, the remote control should now communicate with the local control module of zone D. Moreover, if a number of settings have been defined for zone A and a number of different settings have been defined for zone D, moving the remote control from zone A to zone D should result in that when the remote control is operated, the settings of zone D should be implemented instead of the settings of zone A. Moreover, a mobile fan may be moved from the office located in zone B to the open plan area of zone C on a hot day. In that case, the fan should start operating according to the functional requirements specified for zone C instead of the functional requirements specified for zone B.

Figure 10:
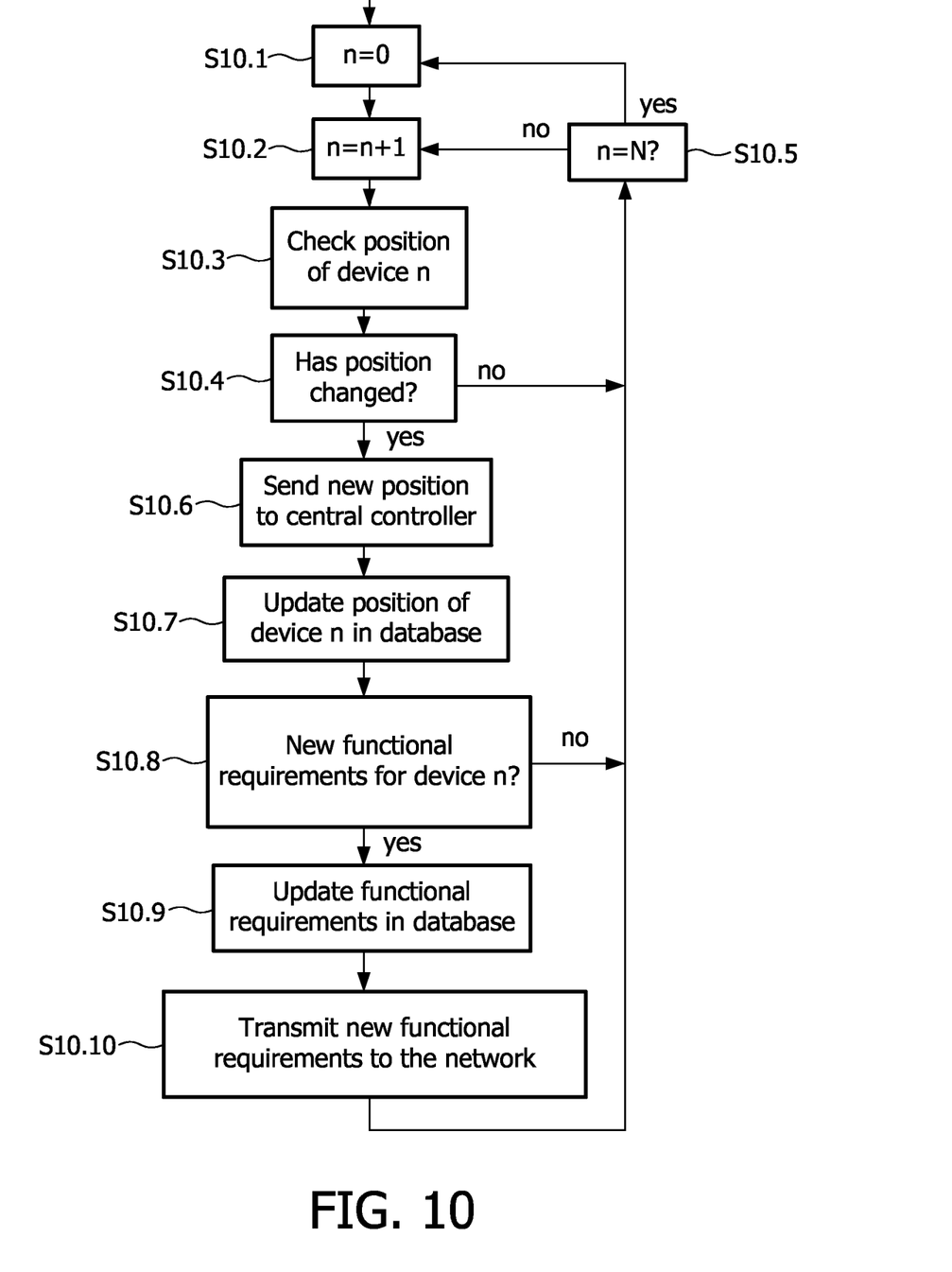
FIG. 10 outlines the steps of a method for updating a system according to the invention.

The procedure for updating the coordinates and functional requirements of a node is described in more detail with respect to FIG. 10. There are N nodes in the system and the procedure considers each node n between 1 and N. At step S10.1, n is set to 0 and at step S10.2, n is incremented by 1. At step S10.3 the position of device n is checked. The device may establish its position by performing time-of-flight measurements to at least three other devices with known positions, for example three different local control modules in the area. If the device is not located at ceiling height it may need to carry out time-of-flight measurements to four devices in order to find its coordinates. After the time-of-flight measurements have been completed, the device may either calculate its coordinates or it may forward the measurements to a local control module, which will perform the calculation. The coordinates will be compared to the old coordinates saved in memory in the old local control module, the device, or both. Alternatively, if storage space is an issue, the old coordinates may be obtained from the central controller. At step S10.4 the new coordinates are compared with the old coordinates. This step may be carried out either in the processor of the device, the local control module or the central controller depending on the particulars of the system. If the coordinates have not changed, the process moves on to step S10.5 and n is compared to the total number N of devices in the system. If n is equal to N, i.e. the position of the last device in the system has been checked, the procedure is restarted at step S10.1. On the other hand, if n is smaller than N, n is incremented by 1 at step S10.2 and the position of the next device in the system is checked.

If the coordinates have changed the process moves on to step S10.6. At step S10.6, the new coordinates are sent to the central controller. The message may also comprise the unique ID of the device. The central controller finds the virtual device with the same unique ID and replaces the saved coordinates of the virtual device with the new coordinates at step S10.7. The software subsequently checks whether the change in position results in any new functional requirements for the device at step S10.8. If instructions to comply with new functional requirements need to be uploaded into the network, the process proceeds to step S10.9. If not, the process proceeds to step 10.5.

At step S10.9, the functional requirements for the virtual device are updated. Consequently, next time a user opens the graphical user interface, the lines linking the device to the other nodes in the network that it is allowed to talk to may have changed. At step S10.10 the new instructions are uploaded into the network via the area controller. The instructions may be stored in the local control module or the device itself. After step S10.10, the process finishes for device n, n is subsequently incremented by 1, S10.2, and the next device is checked, or the procedure is restarted, S10.1.

A modification to the procedure of the method described with respect to FIG. 10 involves not restarting the process every time device n=N is reached, but instead only starting the process in response to a message received at the central controller indicating that a device in the network may have moved. Thus, after device n=N has been considered, the process ends.

In the embodiments of the invention described above, the local control module has been described to be a separate node. However, a modification of the embodiments described may involve that the local control module is incorporated into a node 26, i.e. one of the luminaires, sensors, switches and so on. The memory 27 of the node may be increased to store software for implementing the functionality of a controller of the network. The central controller may then send the instructions to the node 26 acting as the network controller and the node may forward the instructions to the other nodes. In one embodiment, more than one of the nodes have the capacity to function as a network controller. Consequently, if the node that acts as the local controller fails or is removed, another node automatically takes on the role. The process for ensuring that there is always one node acting as the controller may be controlled using software stored in the network.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A method of controlling a physical device in a network to operate according to predetermined functional requirements for the network stored in a data processing apparatus external to the physical device, comprising the steps of:
    defining functional requirements for a virtual device corresponding to the physical device, wherein the predetermined functional requirements comprise the defined functional requirements for the virtual device;
    loading the functional requirements for the virtual device into a memory of the physical device;
    receiving first positional information for the physical device at the data processing apparatus; relating the first positional information to first functional requirements included in the predetermined functional requirements;
    transmitting, by the data processing apparatus, the first functional requirements for the physical device to the network;
    controlling the physical device by the data processing apparatus according to the first functional requirements; and
    automatically determining, by the data processing apparatus, whether updated positional information for the physical device results in any change from the first functional requirements, in response to receiving a message indicating a change in a position of the physical device, and a determination of the updated positional information for the physical device.

2. The method of claim 1, further comprising obtaining coordinates of the physical device in the network based on the first positional information.

3. The method of claim 2, wherein the relating comprises deducing the first functional requirements of the physical device from the stored functional requirements for the network based on the obtained coordinates.

4. The method of claim 2, wherein relating the first positional information to first functional requirements comprises matching the obtained coordinates of the physical device with coordinates of a virtual device and deducing the first functional requirements for the physical device based on the functional requirements for the virtual device.

5. The method of claim 1, further comprising receiving at the data processing apparatus at least one of a unique ID and a network address of the physical device and storing the at least one of a unique ID and a network address of the physical device in memory of the data processing apparatus.

6. The method of claim 5, wherein transmitting the first functional requirements to the network comprises transmitting the first functional requirements to an address in the network based on the at least one of a unique ID and a network address.

7. The method of claim 1, further comprising receiving an indication of characteristics of the physical device and using the indication of the characteristics of the physical device to couple the first positional information of the physical device with the first functional requirements.

8. The method of claim 1, wherein receiving the first positional information and transmitting the first functional requirements comprises receiving the first positional information from and transmitting the first functional requirements to a gateway connected to the physical device.

9. The method of claim 8, wherein the physical device and the gateway communicate using radio frequency signals.

10. The method of claim 1, further comprising previously storing the first functional requirements in memory of the data processing apparatus.

11. The method of claim 10, further comprising prior to storing the first functional requirements, deducing the first functional requirements from electrical wiring diagrams in architectural drawings.

12. A computer program product comprising a non-transitory computer usable medium having a computer readable program code embodied therein, said computer readable program code when executed on a processor-implementing the method of claim 1.

13. An apparatus for controlling an external physical device operable in a network to operate according to predetermined functional requirements for the external physical device in the network including first functional requirements for the external physical device, comprising:
    a processor configured to define functional requirements for a virtual device corresponding to the external physical device, wherein the predetermined functional requirements comprise the defined functional requirements for the virtual device;
    the processor further configured to transmit the functional requirements for the virtual device for loading into a memory of the external physical device;
    a memory configured to store the first functional requirements for the external physical device;
    a receiver configured to receive first positional information of the external physical device, wherein the first positional information of the external physical device is stored in the memory;
    the processor further configured to relate the first positional information to the first functional requirements; and
    a transmitter configured to transmit the first functional requirements for the external physical device to the network,
    wherein the receiver is configured to automatically receive a message indicating a change in a position of the external physical device, and to automatically receive updated positional information from the external physical device, and
    wherein the processor is configured to compare the updated positional information to the first positional information of the external physical device, in response to receiving the message indicating the change in the position of the external physical device, and to determine whether the updated positional information results in any change from the first functional requirements.

14. The apparatus of claim 13, wherein the processor is operable to match the first positional information to the physical device with coordinates of one of the plurality of virtual devices.

15. The apparatus of claim 13, further comprising a graphical user interface for allowing a user to define the first functional requirements, the graphical user interface further allowing the user to view the first functional requirements.

16. The apparatus of claim 13, further comprising means for importing architectural drawings including electrical wiring diagrams and means for deducing the functional requirements for the network from said architectural drawings including electrical wiring diagrams.

17. A physical device operable in a network, comprising:
an application unit;
a receiver configured to receive defined functional requirements for a virtual device corresponding to the physical device, wherein the physical device is configured to operate according to predetermined functional requirements, and wherein the predetermined functional requirements comprise the defined functional requirements for the virtual device;
a processor configured to load the functional requirements for the virtual device into a memory of the physical device;
means for obtaining first positional information of the physical device with respect to at least three other physical devices in the network;
a transmitter configured to transmit the first positional information via the network to an apparatus configured to store the functional requirements including first functional requirements and second functional requirements;
the receiver further configured to receive first instructions via the network in response to transmission of the first positional information to the apparatus;
the processor further configured to process the first instructions and controlling the application unit for operating according to the first functional requirements; and
wherein the processor is configured to automatically determine a change of position of the physical device,
wherein the transmitter is further configured to transmit each of a message indicating the change in the position of the physical device and the updated positional information via the network to the apparatus,
wherein the receiver is further configured to receive second instructions via the network in response to the change of position of the physical device, the second instructions different than the first instructions, and
wherein the processor is further configured to process the second instructions and control the application unit to operate according to the second functional requirements.

* * * * *